US006757067B2

(12) United States Patent
Lee et al.

(10) Patent No.: US 6,757,067 B2
(45) Date of Patent: Jun. 29, 2004

(54) FRINGE PATTERN DISCRIMINATOR FOR GRAZING INCIDENCE INTERFEROMETER

(75) Inventors: Christopher A. Lee, Pittsford, NY (US); Mark J. Tronolone, Fairport, NY (US); Andrew W. Kulawiec, Fairport, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/213,608

(22) Filed: Aug. 6, 2002

(65) Prior Publication Data

US 2004/0027579 A1 Feb. 12, 2004

(51) Int. Cl.[7] ................................................. G01B 9/02
(52) U.S. Cl. ....................................... 356/504; 356/512
(58) Field of Search .............................. 356/503, 504, 356/505, 512

(56) References Cited

U.S. PATENT DOCUMENTS 4,325,637 A * 4/1982 Moore ........................ 356/512
5,532,821 A    7/1996 Tronolone et al.
5,724,137 A    3/1998 Tronolone et al.
5,777,738 A    7/1998 Kulawiec
5,923,425 A    7/1999 Dewa et al.

OTHER PUBLICATIONS

"MetroPro™: The Most Powerful Analysis Software Available", web site for ZygoCorporation, Middlefield, CT. 06455–0448, Jul. 2002.
"Measurements using Fourier Transform Phase Shifting Interferometry", L. L. Deck, , Zygo Corporation.

* cited by examiner

Primary Examiner—Frank G. Font
Assistant Examiner—Patrick Connolly
(74) Attorney, Agent, or Firm—Thomas Ryan

(57) ABSTRACT

Flatness and thickness variation information concerning transmissive plane-parallel test plates is obtained from a grazing incidence interferometer modified to distinguish between superimposed interference patterns containing both types of information. The grazing angle of the interferometer is varied, and unique modulation frequencies of local fringe intensities within the superimposed interference patterns are identified. The local fringe intensities attributable to the different interference patterns are distinguished by their respective modulation frequencies.

23 Claims, 5 Drawing Sheets

FRINGE PATTERN DISCRIMINATOR FOR GRAZING INCIDENCE INTERFEROMETER

TECHNICAL FIELD

Flatness and thickness variation of test pieces can be measured optically by evaluating interference patterns produced between paired surfaces. The flatness of a surface is compared to a reference surface. Thickness variation is compared between two surfaces of a test piece. Grazing incidence interferometry, where at least one of the paired surfaces is illuminated at non-normal angles of incidence, provides for enhancing specular reflectivity and for adjusting the sensitivity of the measurements.

BACKGROUND

Interferometric measurements of thin transmissive test pieces present special problems, because opposite surfaces of the transmissive test pieces can participate in forming multiple interference patterns. For example, interference patterns can be formed between each of the opposite surfaces and a common reference surface as well as between the opposite surfaces themselves. Each of the interference patterns contains information about the test piece, but the information is obscured when the interference patterns overlie each other.

In the grazing incidence interferometer of co-assigned U.S. Pat. No. 4,325,637 to Moore, which is hereby incorporated by reference, spatial coherence of the illuminating beam is limited to exclude interference patterns between surfaces separated beyond a coherence limit. Collimated light reflected from the surfaces laterally shears as a function of the separation between the surfaces. A rotating diffuser interrupts the illuminating beam and reduces spatial coherence so that interference fringes do not form between surfaces separated by more than the distance between intended test and reference surfaces.

However, reduced spatial coherence does not preclude interference fringes from forming between the opposite surfaces of thin transmissive test pieces, whose opposite surfaces are separated by amounts comparable to the separation between the transmissive optic and a reference surface. A first interference pattern measuring flatness is formed between the reference surface and the closest of the opposite test surfaces of the test piece. A second overlying interference pattern measuring thickness (and index) variation is formed between the opposite surfaces of the test piece. A third overlying interference pattern also measuring flatness can be formed (if also within the coherence limit) between the reference surface and the more remote of the opposite surfaces of the test piece. The overlying interference patterns obscure the different flatness or thickness variation information contained within each pattern.

SUMMARY OF INVENTION

Our invention provides for distinguishing among superimposed interference patterns that are formed by a grazing incidence interferometer between paired combinations of a reference surface and two nominally parallel surfaces of a thin transmissive test piece. The grazing angle of the illuminating beam, which is incident upon both the test piece and the reference surface, is varied in a stepwise manner to elicit distinguishing responses from the superimposed interference patterns. The distinguishing responses enable the evaluation of individual interference patterns.

An exemplary method of measuring a transmissive plane parallel test piece with a grazing incidence interferometer includes reflecting a beam of light at a non-normal grazing angle from both a reference surface and two nominally parallel surfaces of the transmissive test piece. A first interference pattern formed between the reference surface and one of the two nominally parallel surfaces of the test piece is superimposed upon a second interference pattern formed between the two nominally parallel surfaces of the test piece. To distinguish between the first and second interference patterns, the non-normal grazing angle of the beam is varied through a range of angles at which local fringe intensities of each of the superimposed interference patterns shift through at least one cycle. A modulation frequency at which the local fringe intensities shift within one of the superimposed interference patterns is determined. The local fringe intensities varying at the modulation frequency are evaluated to extract phase information from the one interference pattern.

For measuring the flatness of one of the nominally parallel surfaces of the test piece, the determined modulation frequency is the modulation frequency at which the local fringe intensities shift within the first interference pattern. For measuring thickness variation between two nominally parallel surfaces of the test piece, the modulation frequency is the modulation frequency at which the local fringe intensities shift within the second interference pattern. The modulation frequencies of both the first and second interference patterns can be determined to evaluate both the flatness and the thickness variation of the test piece surfaces.

Preferably, the non-normal grazing angle is progressively varied through different size angular increments corresponding to approximately even increments of optical path difference between the surfaces evaluated by the one interference pattern. The resulting modulation frequencies remain constant throughout the range of tilt (i.e., the range of grazing angles) for both the interference patterns. However, the modulation frequencies associated with the first and second interference patterns differ as a function of the separation between the surfaces that form them.

Differences between the modulation frequencies of the superimposed interference patterns can be enhanced by adjusting the non-normal grazing angle and the separation between the test piece and the reference surface. The modulation frequency is preferably calculated independently of the step of varying the non-normal grazing angle based on an expected relationship between the test piece and the grazing incidence interferometer.

The beam of light is preferably a temporally coherent beam of spatially coherent-limited light. Shear produced between the various reflections from the reference surface and the two nominally parallel surfaces of the test piece is a function of both the non-normal grazing angle and spacing between the surfaces. A first of the two nominally parallel surfaces of the test piece is oriented adjacent to the reference surface, and a second of the two nominally parallel surfaces is oriented remote from the reference surface. The shear between the reflections from the reference surface and the second of the two nominally parallel surfaces is preferably beyond a spatial coherence limit within which the interference patterns are formed.

Overall, our preferred method exploits the results of a non-normal grazing angle variation to distinguish among superimposed interference patterns produced between paired combinations of a reference surface and two nominally parallel surfaces of a transmissive test piece. A modulation frequency is calculated for a shift of local fringe intensities of one of the superimposed interference patterns as a function of the variations in the non-normal grazing angle at which a light beam producing the interference patterns reflects from the reference surface and the two nominally parallel surfaces of the transmissive test piece. The non-normal grazing angle of the beam is varied through a range of angles at which local fringe intensities of each of the superimposed interference patterns shift through at least one cycle. A succession of superimposed fringe-shifted forms of the interference patterns is produced throughout the range of angles at which the non-normal grazing angle of the beam is varied. Local fringe intensities that progressively vary through the succession of fringe-shifted forms of the interference patterns at the calculated modulation frequency are distinguished from other local fringe intensities that do not similarly vary at the same modulation frequency.

The modulation frequency at which the local fringe intensities shift within one of the superimposed interference patterns is preferably calculated in advance of the production of the superimposed interference patterns based on information known about the test piece and its relationship to the grazing incidence interferometer. The calculation preferably identifies modulation frequencies for both of the superimposed interference patterns, and these modulation frequencies distinguish the progressive variations in local fringe intensities between the two superimposed interference patterns.

Calculating the modulation frequencies in advance of the actual measurements produces more consistent results for measuring similar test pieces by eliminating noise distortions than accompany the actual measurements. The noise distortions can make the true modulation frequencies more difficult to distinguish among other frequencies associated with the noise, especially from a limited number of the fringe-shifted forms of the interference patterns. However, once the modulation frequencies are determined (e.g., by pre-calculation), the progressive variations in the local fringe intensities associated with the different interference patterns can be more easily recognized at the modulation frequencies from a more limited number of the fringe-shifted forms of the interference patterns.

DRAWINGS

FIGS. 3A and 3B represent separate interference patterns between surface pairings, and FIG. 3C represents a combined interference pattern formed by the superposition of the interference patterns of FIGS. 3A and 3B.

DESCRIPTION

Figure 1:
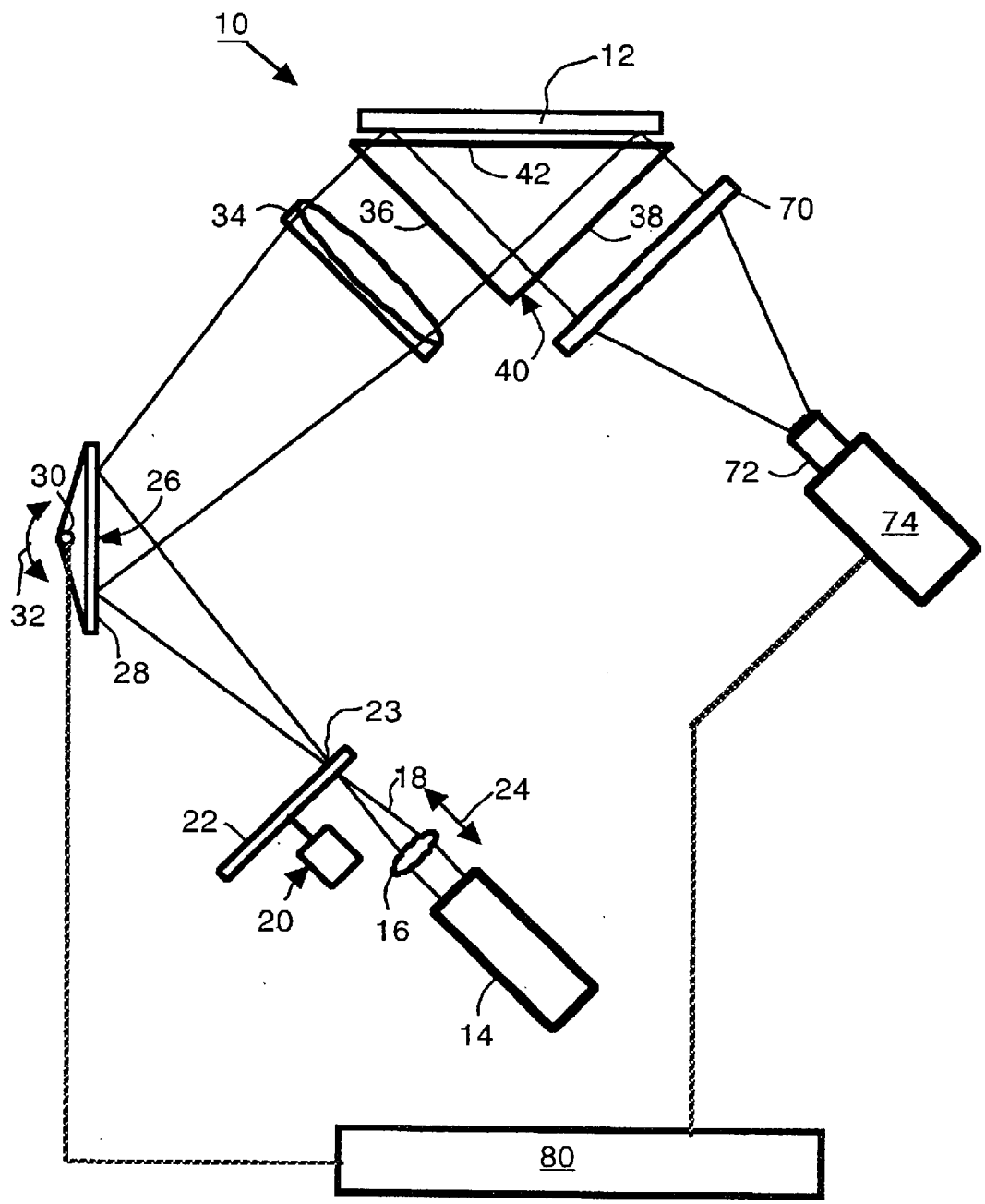
FIG. 1 is a diagram of a grazing incidence interferometer together with a processor for separating overlying interference patterns.

An exemplary grazing incidence interferometer 10 as shown in FIG. 1 provides for measuring both flatness and thickness variation of a transmissive test piece 12, which has the form of a plane parallel plate. A light source 14, such as a laser diode, emits a beam 18 of temporally coherent light, which a focusing lens 16 sets on an initially converging path.

A coherence adjuster 20 having a rotating diffuser plate 22 interrupts a narrowed portion of the beam 18 to reduce spatial coherence of the beam 18. The rotating diffuser plate 22 interrupts the beam 18 and randomly scatters light illuminating a spot 23 on the diffuser plate 22. The light scattered from the spot 23 emulates an extended light source, whose size is inversely related to the degree of spatial coherence of the beam 18. The focusing lens 16 is movable in the directions of arrows 24 to change the size of the illuminated spot 23 for adjusting the spatial coherence of the beam 18.

An expanding portion of the beam 18 propagates through a tilt mechanism 26 having a reflective surface 28 and a pivot 30 for tilting the reflective surface 28 through a limited range of angles in the directions of arrows 32. Similar amounts of beam tilt can be achieved by interrupting the beam 18 with a pivotal plane parallel plate. When inclined from normal to the propagating beam 18, light transmits through the plate from an apparent source that is offset from the extended light source on the diffuser plate 22.

A collimating lens 34, whose focal length is measured from the diffuser plate 22, converts the expanding beam 18 into a nominally collimated beam 18 that approaches one side 36 of a triangular prism 40 at close to normal incidence. The side 36 is preferably one of two equal length sides 36 and 38 that are inclined to a base 42 at approximately 45-degree angles. Although expanded, residual divergence of the nominally collimated beam 18 is slightly increased by the limited spatial coherence of the beam 18, and the average incident angle of the collimated beam 18 approaching the prism 20 can depart slightly from normal by the tilt of the beam 18.

Figure 2:
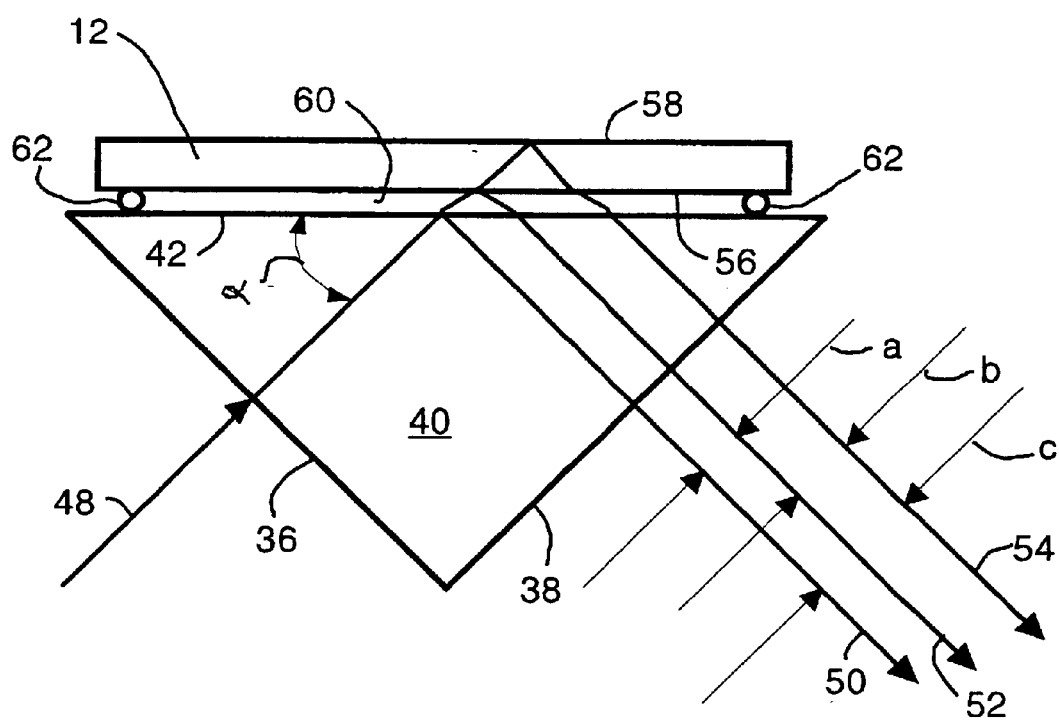
FIG. 2 is an enlarged view of a reference prism and test piece showing a division of a central input ray into three output rays reflected from a reference surface of the prism and two nominally parallel surfaces of the test piece.

With reference to FIG. 2, a central ray 48 of the beam 18 propagates through the prism 40 and is partially reflected from the base surface 42 of the prism 40 through a non-normal grazing angle "α" as a reference beam ray 50. The grazing angle "α" is defined as a non-normal angle inclined from a reflective surface (the base surface 42 of the prism 40) within a range of specular reflection. Angles of so-called "grazing incidence" are complementary to these "grazing angles".

Another portion of the ray 48 is refracted from the base surface 42 through an air gap 60 before being partially reflected from a first surface 56 of two nominally planar surfaces 56 and 58 of the test piece 12 as a first test beam ray 52. Yet another portion of the ray 48 refracts at the first surface 56 and propagates through the test piece 12 before being reflected from the second surface 58 of the two nominally planar surfaces 56 and 58 of the test piece 12 as a second test beam ray 54. The reference beam ray 50 and the two test beam rays 52 and 54 exit the prism 40 through the prism surface 38 relatively sheared but nominally parallel to each other. Preferably, the non-normal grazing angle "α" is at least approximately equal to the complement of a base angle of the prism 40 so that all of the rays 48, 50, 52, and 54 enter or leave the prism 40 at close to normal incidence.

The first test beam ray 52 is sheared with respect to the reference beam ray 50 through distance "a". The second test beam ray 54 is sheared with respect to the first test beam ray 52 through distance "b". The second test beam ray 54 is sheared with respect to the reference beam ray 50 through distance "c". Preferably, the shear distance "c" is beyond the spatial coherence of the beam 18 as set by the coherence adjuster 20. The amount of the shear "a", which is one component of the shear "c", can be adjusted by increasing or decreasing the air gap 60 using different diameter filament mounts 62. Other ways of adjusting the air gap 60 include supports engaging either surface 56 or 58 of the test piece 12.

Figure 3A:
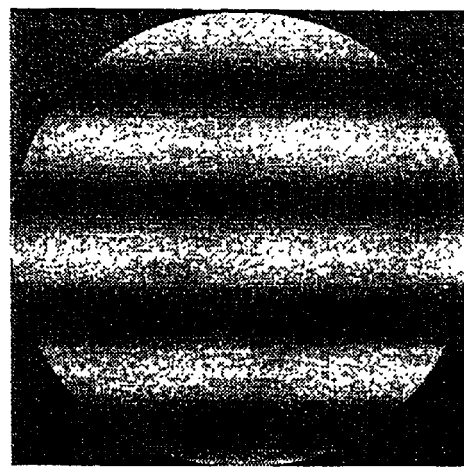
FIGS. 3A–3C are images of exemplary interference patterns.
Figure 3B:
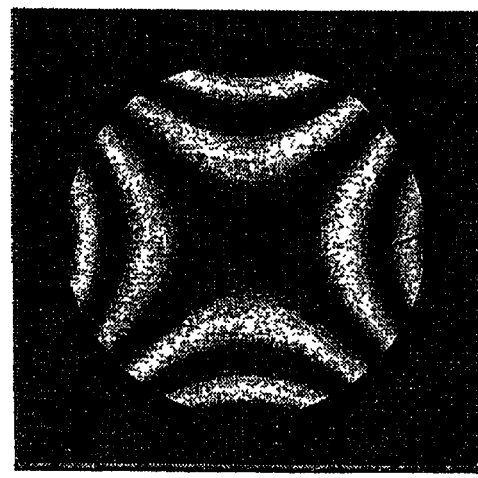

Within the spatial coherence of the beam 18, a first interference pattern 64 (see for example FIG. 3A) containing information concerning the flatness of the test piece surface 56 is formed between a first portion of the light beam 18 (including the ray 50) reflecting from the reference surface 42 and a second portion of the light beam 18 (including the ray 52) reflecting from the first test piece surface 56. A second interference pattern 66 (see for example FIG. 3B) containing information concerning thickness (and index) variations of the test piece 12 is formed between the second portion of the light beam 18 (including the ray 52) reflecting from the first test piece surface 56 and a third portion of the light beam 18 (including the ray 54) reflecting from the second test piece surface 58. Although thickness variations are often the primary source of variation, particularly for homogeneous materials, the interference pattern 66 actually contains information about both thickness variations and index variations of the test piece 12. We generally refer herein to the thickness variations alone, but both thickness variations and index variations are represented by the interference pattern 66 between the opposite surfaces 56 and 58 of the test piece 12.

Figure 3C:
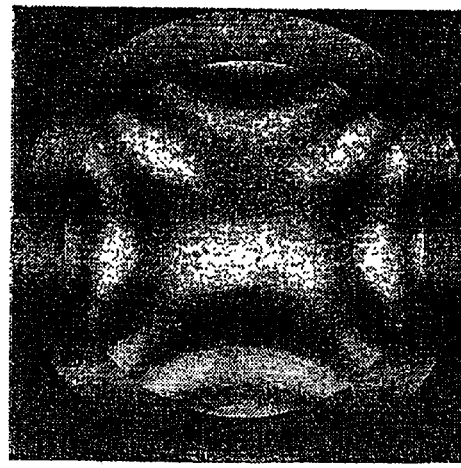

The two interference patterns 64 and 66 appear as a single combined interference pattern 68 (see for example FIG. 3C) on a diffused viewing screen 70, which can be made of ground glass or plastic. The diffused viewing screen 70, which can be rotated or dithered to further randomize the diffusion, fixes an image of the combined interference pattern 68 so than an ordinary zoom lens 72 can project the image onto a recording device 74, such as a charge-coupled device (CCD) camera. Other image-forming optics and recording devices can be used to capture similar information from the combined interference patterns 68 appearing at other locations.

The information concerning the flatness and thickness variation of the test piece 12 is obscured by the superposition of the two interference patterns 64 and 66. Local fringe intensities of the two interference patterns 64 and 66 add together to produce the combined interference pattern 68 within which the information concerning flatness and thickness variation of the test piece 12 is mutually obscured.

We have found that small changes in the grazing angle "α" shift the local fringe intensities of the two interference patterns through cyclical variations, each such cycle of intensity corresponding to the spacing between adjacent fringes. The local fringe intensities of both interference patterns 64 and 66 shift as a result of the changes of the grazing angle "α"; but even more significantly for purposes of this invention, the frequencies (i.e., modulation frequencies) at which the local intensities of the two interference patterns shift can be arranged to differ between the two interference patterns 64 and 66.

Although the local intensities of the two interference patterns vary in predictable ways, the modulation frequencies of the two interference patterns do not remain constant as a function of even incremental variations of the grazing angle "α". This results in modulation frequencies that are chirped and difficult to identify from or attribute to the individual interference patterns 64 and 66. However, by varying the non-normal grazing angle "α" through different size angular increments, the local fringe intensities can be varied at more stable modulation frequencies.

Figure 4A:
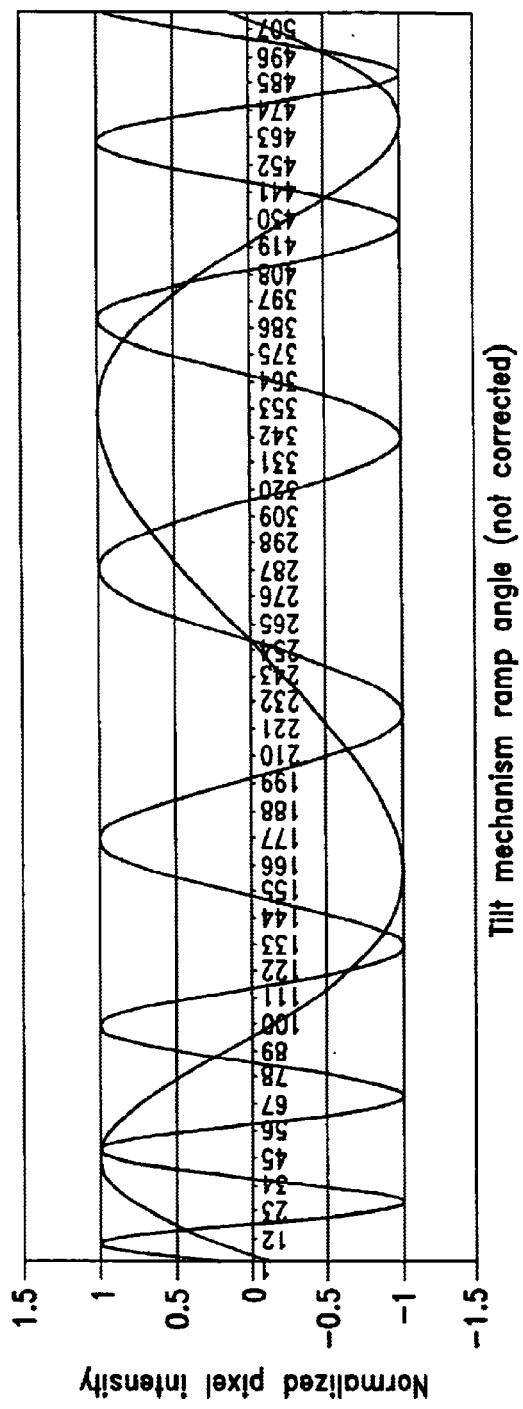
FIGS. 4A–4B are graphs showing two expected frequency components of normalized intensity variations undergone by individual pixels as a function of a changing grazing angle and distinguishing the intensity contributions of the two superimposed interference patterns.
Figure 4B:
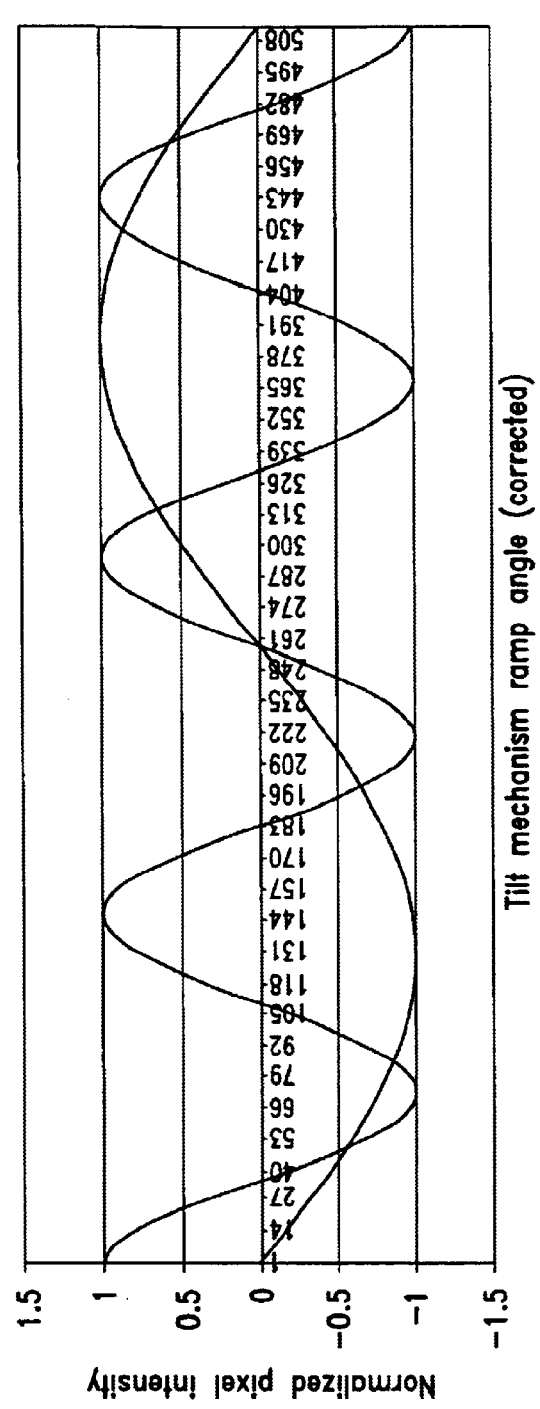

For example, FIGS. 4A and 4B graph expected variations in normalized intensity at individual pixel sensors of the recording device 74 as a function of grazing angle variations. The two depicted modulations 76 and 78 correspond to the different rates of change of normalized intensity within the two interference patterns 64 and 66 associated with the same changes in grazing angle "α". In FIG. 4A, even incremental changes of the tilt mechanism 26 produce frequency variations in the two modulations 76 and 78. However, in FIG. 4B, uneven variations in the grazing angle "α" corresponding to even variations of optical path differences (OPDs) between interfering beams reproduce the modulations 76 and 78 in more stable forms (i.e., with constant frequencies).

The different size angular increments of the grazing angle "α" correspond to approximately even increments of optical path difference between the nominally parallel surfaces compared by the interference patterns 64 and 66. Exact corrections for stabilizing modulation frequency are generally limited to one of the interference patterns 64 and 66, but the residual chirping of remaining modulation frequency is small. Good results have been obtained by preferentially stabilizing the higher 76 of the two modulation frequencies 76 and 78.

Figure 5:
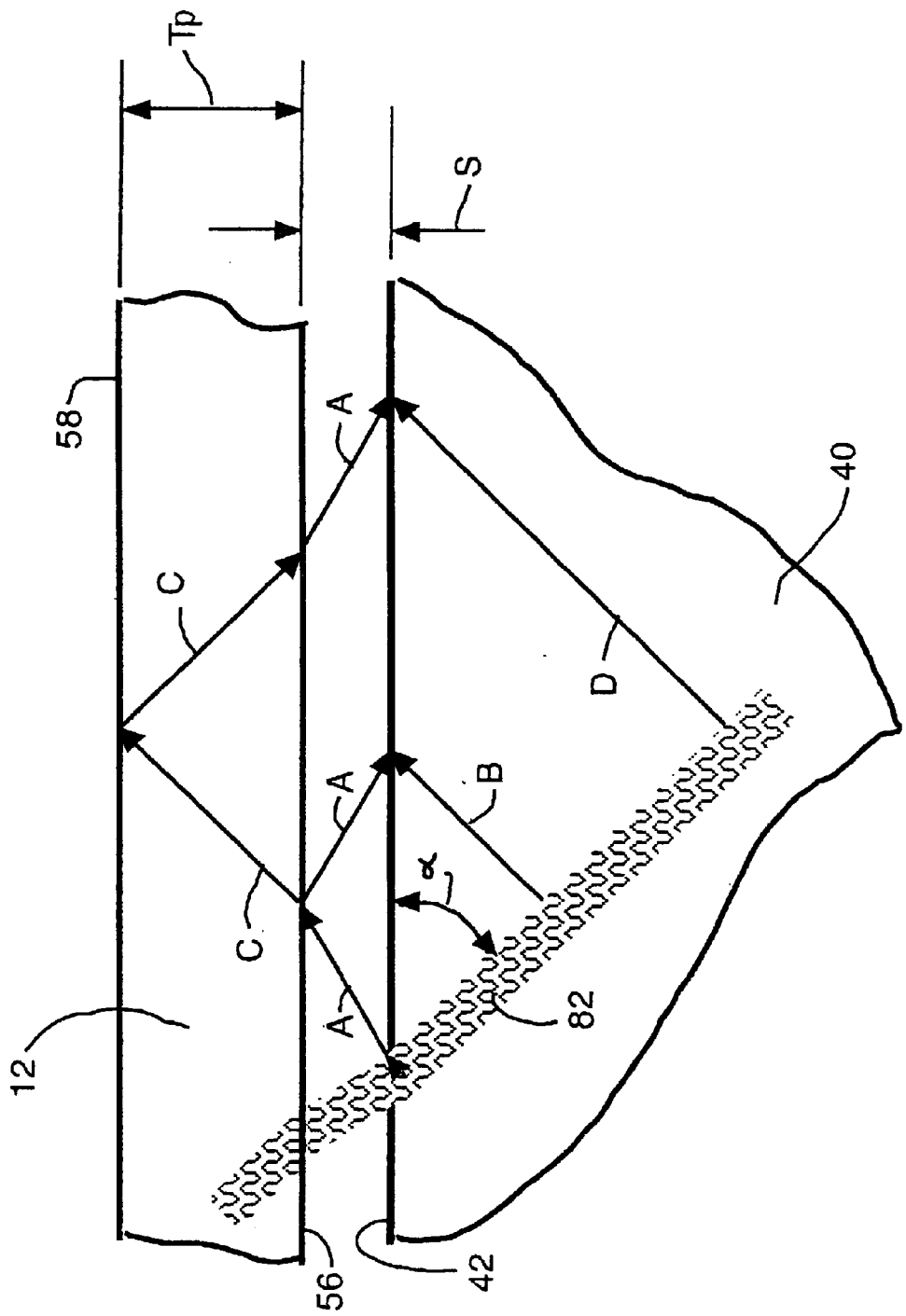
FIG. 5 is an enlarged cut-away diagram showing optical path length differences between interfering beams and their relationship to variables such as the grazing angle.

A schematic representation of optical path differences (OPDs) and their relationship to the grazing angle "α" is provided by FIG. 5. The optical path differences (OPDS) are shown between test rays "A" and "C" reflecting from the opposite surfaces 56 and 58 of the test surface 12 and interfering reference rays "B" and "D" reflected from the reference surface 42 of the prism 40. The light beam 18 of the prior illustrations is depicted in FIG. 5 as a nominally planar wavefront 82 approaching the reference surface 48 at the grazing angle "α".

An optical path difference (OPD) between reflections from the first test piece surface 56 and the reference surface 42 is apparent as the sum of the two lengths of the rays "A" minus the length of the ray "B" (i.e., 2A−B). An optical path difference (OPD) between the second test piece surface 58 and the reference surface 42 is apparent as the sum of the two lengths of the rays "A" and the two lengths of the rays "C" minus the length of the ray "D" (i.e., 2A+2C−D). Predicted optical path length differences (OPDs) among the surfaces 56 and 58 of the test piece 12 and the reference surface 42 of the prism can be readily calculated based on the grazing angle "α", a spacing "S" between the test piece 12 and the reference surface 42, an average thickness "Tp" of the test piece 12, and the refractive indices of the test piece 12 and the prism 40. The effect of changes in the grazing angle "α" on the optical path differences (OPDs) can be similarly predicted for determining the required changes in grazing angle "α" to produce even increments of the optical path differences (OPDs).

Under the control of a computer processor 80, intensity data from the combined interference pattern 68 is collected at the even increments of optical path differences (OPDs) for one or more cycles of the lower 78 of the two pre-calculated modulation frequencies 76 and 78. For example, 32 to 64 frames of data can be collected over the interval to record progressively changing images of the combined interference pattern 68 in pixel arrays. The pre-calculated modulation frequencies 76 and 78 are applied within a conventional Fourier transform to the collected data to distinguish intensity components of the two interference patterns 64 and 66. The data for each pixel collected in the data frames undergoes a discreet Fourier transform. Intensity components of the pixels varying at the higher predetermined modulation frequency 76 are attributed to the interference pattern 64 between the first surface 56 of the test piece 12 and the reference surface 42 of the prism 40 (measuring flatness), and the intensity components of the same pixels varying at the lower predetermined modulation frequency 78 are attributed to the other interference pattern 66 between the first and second 56 and 58 surfaces of the test piece 123 (measuring thickness variation).

Once the intensity data is distinguished between the interference patterns 64 and 66, the relevant intensity data from the data frames can be used for purposes of phase shifting to more accurately measure intensity (i.e., phase) variations within each of the interference patterns 64 and 66. The processor can be connected to one or more output devices (not shown) to report the measurement results.

While it may be possible to derive the two different modulation frequencies 76 and 78 from the successive frames of captured intensity data, system noise can alter or obscure the identification of the modulation frequencies 76 and 78. The factors that determine the modulation frequencies including the grazing angle "$\alpha$", the thickness "Tp" of the test piece 12, the spacing "S" between the test piece 12 and the prism 40, and the refractive indices of the traversed mediums are all known in advance. In fact, the variables such as the grazing angle "$\alpha$" and the spacing "S" can be optimized in advance of the actual measurements to separate the predetermined modulation frequencies 76 and 78. By calculating the expected modulation frequencies in advance, processing requirements for interpreting the measurements are reduced and the results are more reliable.

We claim:

1. A method of measuring a transmissive plane parallel plate with a grazing incidence interferometer comprising steps of:
   reflecting a beam of light at a non-normal grazing angle from both a reference surface and two nominally parallel surfaces of the transmissive plate producing at least two different interference patterns;
   superimposing a first of the interference patterns that is formed between the reference surface and one of the two nominally parallel surfaces of the transmissive plate on a second of the interference patterns that is formed between the two nominally parallel surfaces of the transmissive plate;
   varying the non-normal grazing angle of the beam through a range of angles at which local fringe intensities of each of the superimposed interference patterns shift through at least one cycle;
   determining a modulation frequency at which the local fringe intensities shift within one of the superimposed interference patterns; and
   evaluating the local fringe intensities varying at the modulation frequency to extract phase information from the one interference pattern.

2. The method of claim 1 in which the step of varying includes progressively varying the non-normal grazing angle through different size angular increments.

3. The method of claim 2 in which the different size angular increments correspond to approximately even increments of optical path difference between the nominally parallel surfaces evaluated by the one interference pattern.

4. The method of claim 1 in which the step of determining includes calculating a modulation frequency based on details of the transmissive plate and the grazing incidence interferometer.

5. The method of claim 4 in which the modulation frequency is calculated independently of the step of varying the non-normal grazing angle based on an expected relationship between the transmissive plate and the grazing incidence interferometer.

6. The method of claim 5 in which the modulation frequency is calculated in advance of the step of varying the non-normal grazing angle.

7. The method of claim 6 in which the calculation of the modulation frequency is based at least in part on input variables including the non-normal grazing angle of the beam and a spacing between the reference surface and the transmissive plate.

8. The method of claim 1 including a further step of generating a temporally coherent beam of spatially coherent-limited light.

9. The method of claim 8 in which the step of reflecting includes producing lateral shear between the reflections from the reference surface and the two nominally parallel surfaces of the transmissive plate as a function of both the non-normal grazing angle and a spacing between the surfaces.

10. The method of claim 9 in which a first of the two nominally parallel surfaces is oriented adjacent to the reference surface and a second of the two nominally parallel surfaces is oriented remote from the reference surface, and the shear between the reflections from the reference surface and the second of the two nominally parallel surfaces is beyond a spatial coherence limit within which an interference pattern is formed.

11. The method of claim 1 in which:
    the step of determining a modulation frequency includes determining the modulation frequency at which the local fringe intensities shift within the first interference pattern, and
    the step of evaluating the local fringe intensities includes evaluating the local fringe intensities varying at the modulation frequency to extract phase information from the first interference pattern for measuring flatness of one of the nominally parallel surfaces of the plate.

12. The method of claim 11 in which the modulation frequency at which the local fringe intensities shift within the first interference pattern is a first of two modulation frequencies and
    the step of determining a modulation frequency also includes determining a second modulation frequency at which the local fringe intensities shift within the second interference pattern, and
    the step of evaluating the local fringe intensities also includes evaluating the local fringe intensities varying at the second modulation frequency to extract phase information from the first interference pattern for measuring thickness variations between the nominally parallel surfaces of the plate.

13. A method of distinguishing among superimposed interference patterns that are produced by a grazing incidence interferometer between paired combinations of a reference surface and two nominally parallel surfaces of a transmissive test piece comprising steps of:
    calculating a modulation frequency at which local fringe intensities of one of the superimposed interference patterns shift as a function of variations in a non-normal grazing angle at which a light beam producing the interference patterns reflects from the reference surface and the two nominally parallel surfaces of the transmissive test piece;

varying the non-normal grazing angle of the beam through a range of angles at which local fringe intensities of each of the superimposed interference patterns shift through at least one cycle;

producing a succession of the superimposed fringe-shifted forms of the interference patterns associated with the varied non-normal grazing angle of the beam; and distinguishing the local fringe intensities that progressively vary through the succession of fringe-shifted forms of the interference patterns at the calculated modulation frequency from other local fringe intensities that do not similarly vary at the modulation frequency.

14. The method of claim 13 in which the modulation frequency at which the local fringe intensities shift within one of the superimposed interference patterns is preferably calculated in advance of the step of producing the superimposed fringe-shifted forms of the interference patterns.

15. The method of claim 14 in which the modulation frequency is calculated based on information known about the test piece and its relationship to the grazing incidence interferometer.

16. The method of claim 15 in which the step of calculating includes calculating modulation frequencies of the local fringe intensities of both of the superimposed interference patterns.

17. The method of claim 16 in which the step of distinguishing includes distinguishing the local fringe intensities that progressively vary through the succession of fringe-shifted forms of a first of the interference patterns at a first of the calculated modulation frequencies from the local fringe intensities that progressively vary through the succession of fringe-shifted forms of a second of the interference patterns at a second of the calculated modulation frequencies.

18. The method of claim 13 in which the step of varying the non-normal grazing angle of the beam includes varying the non-normal grazing angle through different size angular increments.

19. The method of claim 18 in which the different size angular increments correspond to approximately even increments of optical path difference between paired combinations of a reference surface and two nominally parallel surfaces of a transmissive test piece.

20. A system for measuring test pieces having nominally parallel surfaces comprising:

a grazing incidence interferometer within which a beam of light reflects at a non-normal grazing angle from a reference surface and the nominally parallel surfaces of the test piece, producing a first interference pattern between the reference surface and one of the nominally parallel surfaces of the test piece and a second superimposed interference pattern between the two nominally parallel surfaces of the test piece;

a tilt mechanism that varies the non-normal grazing angle of the beam through a range of angles at which local fringe intensities of each of the superimposed interference patterns shift through at least one cycle;

a capturing device for gathering data from a succession of the superimposed fringe-shifted forms of the interference patterns associated with the varied non-normal grazing angle of the beam; and a processor that:
  (a) calculates a modulation frequency at which the local fringe intensities of one of the superimposed interference patterns shift as a function of the variations in the non-normal grazing angle, and
  (b) distinguishes the local fringe intensities that progressively vary through the succession of fringe-shifted forms of the interference patterns at the calculated modulation frequency from other local fringe intensities that do not similarly vary at the modulation frequency.

21. The system of claim 20 in which the processor relates even increments of optical path difference between paired combinations of the reference surface and two nominally parallel surfaces to uneven increments of variation in the non-normal grazing angle of the beam.

22. The system of claim 20 in which the processor calculates modulation frequencies at which the local fringe intensities of both of the superimposed interference patterns shift as a function of the variations in the non-normal grazing angle.

23. The system of claim 22 further comprising an adjustment that varies a spacing between the reference surface and the test piece to separate the two modulation frequencies.

* * * * *